United States Patent [19]

Maschek et al.

[11] Patent Number: 4,810,891

[45] Date of Patent: Mar. 7, 1989

[54] METHOD FOR THE AUTOMATIC IDENTIFICATION OF THE TYPE OF MEASURING HEAD OF A FIBER OPTIC MEASUREMENT VALUE ACQUISITION AND TRANSMISSION DEVICE

[75] Inventors: Martin Maschek, Würenlos; Georg Mastner, Niederrohrdorf, both of Switzerland

[73] Assignee: BBC Brown Boveri AG, Baden, Switzerland

[21] Appl. No.: 115,048

[22] Filed: Oct. 30, 1987

[30] Foreign Application Priority Data

Nov. 5, 1986 [DE] Fed. Rep. of Germany ....... 3637689

[51] Int. Cl.⁴ .................................................. G02F 1/00

[52] U.S. Cl. .................................... 250/551; 250/227; 455/617

[58] Field of Search ................ 250/222, 551; 455/606, 455/607, 612, 617

[56] References Cited

U.S. PATENT DOCUMENTS 4,208,579 7/1980 Scrivo et al. ........................ 250/227
4,326,298 4/1982 Fromm et al. ...................... 455/617
4,596,049 7/1986 Rizzotti, III ........................ 455/617

OTHER PUBLICATIONS

B. Pressley, "Recent Fiber Optic Data Link Developments", 1986, Nuclear Electromagnetic Pulse Meeting, University of New Mexico.

*Primary Examiner*—David C. Nelms
*Assistant Examiner*—Stephone B. Allen
*Attorney, Agent, or Firm*—Oblon, Fisher, Spivak, McClelland & Maier

[57] ABSTRACT

A system for the automatic identification of the type of measuring head (1) of a fiber optic measurement value acquisition and transmission device which exhibits a measurement signal fiber (3) and a control signal fiber (4), in which the measuring head (1) can be remotely operated from a control unit (2) by means of control signals which are transmitted via the control signal fiber and, in particular, can be caused to emit a calibration signal. According to the invention, calibration signals of different frequencies are provided for various types of measuring heads. Using the frequency of the calibration signal, the control device is capable of identifying in each case the measuring head connected to it.

3 Claims, 1 Drawing Sheet

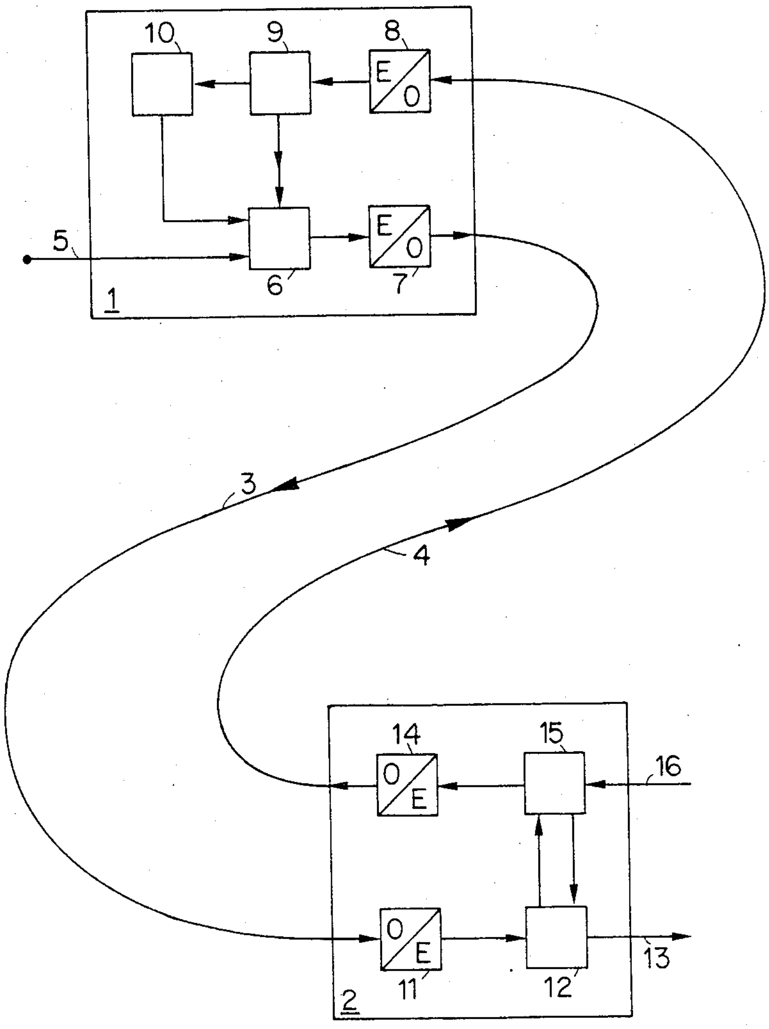
10
9
8
E
O
E
O
5
6
7
1
3
4
14
15
16
O
E
O
E
13
11
12
2

METHOD FOR THE AUTOMATIC IDENTIFICATION OF THE TYPE OF MEASURING HEAD OF A FIBER OPTIC MEASUREMENT VALUE ACQUISITION AND TRANSMISSION DEVICE

BACKGROUND OF THE INVENTION

1. Field of the Invention

The present invention relates to a system for the automatic identification of the type of measuring head of a fiber optic measurement value acquisition and transmission device.

2. Discussion of the Background

A device as supposed in the introductory clause of the claim is known, for example, from "B. Pressley, 'Recent Fiber Optic Data Link Developments', 1986 Nuclear Electromagnetic Pulse Meeting, University of New Mexico".

Fiber optic measurement value acquisition and transmission devices are used for transmitting electric measurement values from an environment with high electromagnetic interference or across relatively great potential differences. The measuring head of these devices is usually fed from an inbuilt battery. The measurement values are transmitted via a measurement signal fiber. In addition to this fiber, another optic fiber is also present in most cases via which the measuring head can be remotely operated by means of control signals from a control unit.

This remote controlling includes the switching on and off of the head, the range selection and the transmission of a calibration signal (typically rectangular) generated in the measuring head.

The control unit can also be designed in such a manner that it can operate various types of measuring head (other measuring ranges and/or input impedances). Appropriate switching over of the control unit is then necessary to match it to the respective type of measuring head. If this is forgotten or carried out wrongly, wrong results can be produced or the measuring head can even be damaged due to mishandling.

Normally, the measuring head can be automatically identified only where, in addition to the measurement value transmission, a bidirectional command and signalling communication also exists between the measuring head and the control unit. However, this makes the entire device more complicated and expensive.

SUMMARY OF THE INVENTION

The present invention has the object of providing the possibility for an automatic identification of the measuring head and corresponding automatic switch-over of the control unit with minimum additional expenditure.

According to the present invention, the above object and other objects are achieved by providing a system for the automatic identification of the type of measuring head of a fiber optic measurement value acquisition and transmission link, including a control unit for remotely controllig the measuring head; a measuring signal fiber and a control signal fiber both connected between the control unit and the measuring head; the control unit including means for sending a control signal to the measuring head via the control signal fiber; the measuring head including means for receiving the control signal and in response to the control signal transmitting to the control unit via the measuring signal fiber a calibration signal having a frequency indicative of a predetermined operating characteristic of the measuring head; and the control unit including means for receiving the calibration signal and detecting the frequency of the calibration signal thereby to determine the predetermined operational characteristic of the measuring head.

The possibility of mishandling can be completely eliminated with this method without any need for having to introduce an additional signalling link from the measuring head to the control unit.

BRIEF DESCRIPTION OF THE DRAWING

Other features and advantages of the present invention are found in the description below, particularly taking into consideration the attached drawing in which a fiber optic measurement value acquisition and transmission device is shown in diagrammatic representation in a single figure.

DESCRIPTION OF THE PREFERRED EMBODIMENTS

Reference will now be made to the drawing. The measurement value acquisition and transmission device diagrammatically shown in this drawing exhibits a measuring head 1 and a control unit 2. These units are connected to one another via a measurement signal fiber 3 and a control signal fiber 4. The measurement signal fiber 3 and the control signal fiber 4 are both optical waveguides. They bridge, for example, a large potential difference or a zone with high electromagnetic interference.

The measuring head 1 exhibits an input 5. Via this input 5, the measuring head 1 receives an electric signal which is to be acquired, for example, with respect to its amplitude. The input 5 is connected to an electronic signal procesing unit 6 in which, for example, the determination of amplitude is carried out and a corresponding electronic measurement signal is generated. In parallel with the input 5, the output of a calibrator 10 is applied to the electronic signal processing unit 6. The electronic signal processing unit 6 and the calibrator 10 are controlled by a first control logic 9. At the output side, the electronic signal processing unit 6 is connected to the measurement signal fiber 3 via an electro/optical transducer 7. The input of the control logic 9 is connected to the control signal fiber 4 via an optical electronic transducer 8.

The control unit 2 exhibits an electronic signal processing unit 12. The input of this unit is connected to the measurement signal fiber via an optical/electronic transducer 11. Its output forms the measurement signal output 13 of the control unit 2. The control unit 2 also contains a control logic 15. An output of this second control logic 15 is connected via an electro/optical transducer 14 to the control signal fiber 4. Another output is connected to the electronic signal processing unit 12. An output of this signal processing unit is conversely connected to the second control logic. Control commands from outside the control unit 2 can be entered into the second control logic 15 via a control input 16.

The measurement signal fiber 3 is used for transmitting the measurement signal generated by the electronic signal processing unit 6 in the measuring head 1. In addition, a calibration signal generated by the calibrator 10 is also transmitted via this fiber.

The control signal fiber 4 is used for transmitting control signals from the control unit 2 to the measuring head 1, in particular to its remote control.

The measuring head 1 can also be switched on remotely via the control signal fiber 4. During remote switch-on, a control signal is first generated by the second control logic 15, for example following a corresponding control command from the outside via control input 16. When the control signal is received, the first control logic 9 in the measuring head 1 causes the calibrator 10 to emit a calibration signal. The calibration signal is transmitted via the electronic signal processing unit 6 and the measuring signal fiber 3 to the electronic signal processing unit 12 in the control unit 2. In the control unit 2, the calibration signal is also supplied to the second control logic 15.

The calibration signal is preferably a rectangular signal. The frequency of the calibration signal is characteristic of the special type of measuring head 1. A different type of measuring head would supply a calibration signal having a different frequency.

The second control logic 15 analyzes the frequency of the calibration signal and determines from it the type of measuring head connected.

The corresponding information is subsequently used by it for matching the electronic signal processing unit 12 to the measuring head 1. The matching can consist, for example, in switching over the scaling factor of the last-mentioned unit (12). In this case, the second control logic 5 would have to generate a corresponding switch-over or matching command.

The generation of a measurement signal, corresponding to the signal at input 5, through the electronic signal processing unit 6 blocked by the first control logic 9 in the measuring head 1 as long as the calibrator 10 is emitting the calibration signal.

The device described is ready for operation after the electronic signal processing unit 16 in the control unit 2 has been matched up.

What is claimed as new and desired to be secured by Letters Patent of the United States:

1. A system for the automatic identification of the type of measuring head of a fiber optic measurement value acquisition and transmission link, comprising:

control unit for remotely controlling said measuring head;

a measuring signal fiber and a control signal fiber both connected between said control unit and said measuring head;

said control unit including means for sending a control signal to said measuring head via said control signal fiber;

said measuring head comprising means for receiving said control signal and in response to said control signal transmitting to said control unit via said measuring signal fiber a calibration signal having a frequency indicative of a predetermined operating characteristic of said measuring head; and said control unit comprising means for receiving said calibrating signal and detecting the frequency of said calibration signal thereby to determine said predetermined operational characteristic of said measuring head.

2. The system according to claim 1, wherein said control signal applied to said measuring head is a measuring head turn-on signal, said measuring head turning on in response to transmission of said turn-on signal and comprising means for producing said calibration signal in response to said turn-on signal.

3. The system according to claim 1 or 2, wherein said control unit comprises:

means for matching a predetermined adjustable operating characteristic of said control unit in correspondence with the predetermined operating characteristic of said measuring head in correspondence with the detected frequency of said calibration signal transmitted by said measuring head.

* * * * *